United States Patent [19]

Hays et al.

[11] Patent Number: 4,462,833

[45] Date of Patent: Jul. 31, 1984

[54] PROCESS FOR TREATING DIARYLIDE YELLOW PIGMENT

[75] Inventors: Byron G. Hays, Verona; Philip L. Maguire, North Haledon, both of N.J.

[73] Assignee: Inmont Corporation, Clifton, N.J.

[21] Appl. No.: 453,685

[22] Filed: Dec. 27, 1982

[51] Int. Cl.³ .............................................. C09D 11/00
[52] U.S. Cl. ...................................... 106/23; 106/22; 106/308 N
[58] Field of Search ........... 106/23, 22, 288 Q, 308 Q, 106/308 N

[56] References Cited

U.S. PATENT DOCUMENTS

| | | | |
|---|---|---|---|
| 3,532,520 | 10/1970 | Dawson et al. | 106/23 |
| 3,655,641 | 4/1972 | Hamilton | 260/176 |
| 3,775,148 | 11/1973 | Bradley | 106/288 Q |

*Primary Examiner*—John Kight
*Assistant Examiner*—Amelia B. Yarbrough
*Attorney, Agent, or Firm*—M. R. Chipaloski; E. R. Skula

[57] ABSTRACT

Diarylide yellow pigments are treated with linear alkyl poly-amines to obtain pigments that are easily dispersible in aromatic publication gravure inks and show less penetration into and higher gloss on uncoated paper stock.

13 Claims, No Drawings

PROCESS FOR TREATING DIARYLIDE YELLOW PIGMENT

This invention relates to diarylide yellow pigments having improved penetration resistance and gloss, and the use of the pigments in printing inks.

Diarylide yellow pigments are pigments made by coupling tetrazotized dichlorobenzidine with an arylide of aceto-acetic acid. The diarylide yellow pigments are used extensively in printing inks.

BACKGROUND OF THE INVENTION

The treatment of azo pigments with amines is known. U.S. Pat. No. 3,532,520 discloses treating azo acylacetarylamide pigments with alkyl diamines. An amine or diamine in combination with a resinic acid are disclosed in U.S. Pat. No. 3,653,936. Branched alkyl amines and diamines are disclosed in U.S. Pat. No. 3,655,641. U.S. Pat. No. 3,759,733 discloses use of alkyl amines or amine oxides. Primary, secondary and tertiary amines are disclosed in U.S. Pat. No. 3,775,148. U.S. Pat. No. 3,827,902 discloses use of aryl alkyl diamines. A heterocyclic amine and diamine are disclosed in U.S. Pat. No. 3,905,825. Branched chain dimer acid-based diamines or heterocyclic amines are disclosed in U.S. Pat. No. 4,220,473. Combinations of amines or diamines with fatty/rosin acids and carboxylated resins are disclosed in U.S. Pat. No. 4,301,049.

Although treatments with the above mentioned amines do effect substantial improvements in the ease of dispersing the pigments into ink vehicles, these treated pigments give fluid inks (gravure and flexographic) with deficiencies in properties such as brightness, holdout, gloss and penetration resistance. These properties are particularly difficult to achieve with gravure inks containing highly aromatic solvents, such as toluene. When such inks are printed on thin, uncoated paper stocks, the inks penetrate to the opposite side, leaving a print with poor holdout and gloss and making it difficult to print cleanly on the other side of the paper.

SUMMARY OF THE INVENTION

It has now been found that these disadvantages can be overcome and an easily dispersible, non-penetrating, high gloss bright yellow pigment that is particularly suitable for use in toluene based gravure inks can be obtained surprisingly by treating pigments with a long-chain alkyl linear poly-amine. Suitable amines have the general formula:

wherein R is a long-chain alkyl group (saturated or unsaturated) with at least 12 carbons (preferably 16–18 carbons) and n is at least 3. Particularly useful is the tetramine: 1,3 propanediamine, N-(3-amino propane)-N'-(N-tallow alkyl-3-aminopropane) having the structure

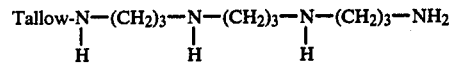

DESCRIPTION OF THE PREFERRED EMBODIMENTS

Diarylide yellow pigments are treated with linear alkyl polyamines to obtain pigments that are easily dispersible in aromatic publication gravure inks and show less penetration into and higher gloss on uncoated paper stock.

Suitable amines have the general formula:

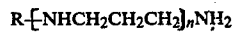

wherein R is a long-chain alkyl group (saturated or unsaturated) with at least 12 carbons (preferably 16–18 carbons) and n is at least 3. Particularly useful is the tetramine: 1,3 propanediamine, N-(3-amino propane)-N'-(N-tallow alkyl-3-aminopropane).

According to the process of this invention, the pigment and the amine are generally contacted under aqueous conditions. In the case of couplings with acetoacetanilide, however, the pigment and the amine may be contacted under anhydrous conditions, preferably at a temperature above about 50° C. The modified pigment may be used directly, but preferably it is used in combination with untreated pigment in a ratio of amounts of about 1 part of modified pigment up to about 5 parts of untreated pigment to obtain the desired properties.

The amount of the amine used in the process of this invention may vary widely, depending upon the particular pigment that is being treated. In general, it is used in an amount of 1–100, and preferably about 5–45, percent, based on the weight of the pigment, when aqueous conditions are used. When the conditions are anhydrous, an excess of the amine is used and the amount, based on the weight of the pigment, may be up to about 200 percent or higher.

When aqueous conditions are used, the amine may be added to the pigment component at any convenient time: e.g., before or during coupling; to the aqueous slurry after coupling; or to the aqueous presscake of the pigment. It may be added as is, as an aqueous dispersion of the free base, dissolved or partially dissolved as its acidic salt, or as a solution in an organic solvent, but the final heating involves the amine in its free base form. The heating may be carried out on the composition as a slurry or as a presscake and, if desired, it may be under pressure.

The preferred process is to add the amine to an acidic aqueous slurry of the azo pigment; heat at about 50° to 100° C., and preferably about 80° to 95° C.; adjust the pH to 10 or more; wash, filter and dry at a temperature above 50° C.

The pigments treated by the process of this invention are particularly suitable for use in publication rotogravure inks. The pigments are easily dispersed in the ink vehicle. The inks do not penetrate uncoated paper stock, and they have excellent flow properties, color strength, brightness, and gloss.

The invention is illustrated by the following examples in which all parts and percentages are by weight unless otherwise specified.

EXAMPLE 1

An aqueous Pigment Yellow 12 (AAA Diarylide Yellow) slurry, prepared by tetrazotization of 160 parts of 3,3'-Dichlorobenzidine and subsequent coupling into 235 parts acetoacetanilide, was split into four equal parts. One of the parts was left untreated; the other parts were treated with dilute acetic acid solutions of 10 parts tallow diamine (Armak Duomeen T ™), tallow triamine (Armak Armosperse 300 ™) or tallow tetramine (Armak "Tetramine T"), which is 1,3 propanediamine, N-(3-amino propane)-N'-(N-tallow alkyl-3-aminopropane). All the slurries were heated to 85° C., neutralized with caustic solution to pH 10, filtered, washed and dried at 80° C. overnight. The dried pigments were dispersed at 10% in a publication gravure limed rosin/toluene/clay bulk ink and reduced to printing viscosity (18 seconds in a Shell No. 2 cup) with toluene: The untreated pigment gave a very high viscosity bulk ink and required 140 cc. toluene/100 g. bulk ink for reduction to printing viscosity. The treated (Duomeen T, Armosperse 300 and "Tetramine T") pigments gave low viscosity bulk inks that required 32 cc., 24 cc. and 22 cc. toluene/100 g. bulk ink for reduction. Drawdowns of the reduced inks on various types of paper gave the following results: The untreated pigment showed no penetration of the papers, but very low gloss. The pigment treated with Duomeen T showed much penetration of various types of paper and low gloss; the pigment treated with Armosperse 300 showed less penetration and better gloss. Surprisingly, the pigment treated with "Tetramine T" showed no penetration of all of the uncoated papers, except for a very thin 30 lb./ream paper; this pigment also gave the highest gloss ink on both coated and uncoated papers.

EXAMPLE 2

A pigment was made like those in Example 1, but was treated with a diamine containing higher relative amine content, Duomeen C. When evaluated as in Example 1, this pigment showed more penetration and lower gloss than the pigment treated with "Tetramine T."

EXAMPLE 3

A pigment was made like those in Example 1, but was treated with a branched dimer acid-based tetramine, Kemamine DD 3680 from Humko Sheffield. When evaluated as in Example 1, this pigment showed slightly less penetration, but much lower gloss and strength than the pigment treated with "Tetramine T."

We claim:

1. A diarylide yellow pigment composition in which the diarylide yellow pigment has been treated with a polyamine, wherein the improvement comprises:
   using as the polyamine a linear alkyl polyamine, said polyamine having the formula

   $$R-NH-CH_2-CH_2-CH_2-{}_n NH_2$$

wherein R is a saturated or unsaturated alkyl group having at least 12 carbon atoms and n is at least 3, thereby producing such treated pigments which are easily dispersible in inks and show less penetration into and higher gloss on uncoated paper stock.

2. The piegment composition as recited in claim 1 wherein the diarylide yellow pigment is contacted with about 5%–45% of said polyamine based upon the weight of the pigment.

3. The pigment composition of claim 1 which additionally contains untreated diarylide yellow pigment in a ratio of about 1 part by weight of said treated pigment composition to about 5 parts by weight of said untreated pigment.

4. A diarylide yellow pigment composition in which the diarylide yellow pigment has been treated with a polyamine, wherein the improvement comprises:
   using as the polyamine a linear alkyl polyamine, said polyamine comprising 1, 3 propanediamine, N-(3-amino propane)- N'-(N-tallow alkyl-3-aminopropane), thereby producing such treated pigments which are easily dispersible in inks and show less penetration into and higher gloss on uncoated paper stock.

5. The pigment composition as recited in claim 4 wherein the diarylide yellow pigment is contacted with about 5%–45% of said polyamine, based upon the weight of the pigment.

6. The pigment composition of claim 4 further comprising untreated diarylide yellow pigment in a ratio of about 1 part by weight of said treated pigment composition to about 5 parts by weight of said untreated pigment.

7. A printing ink containing a diarylide yellow pigment, composition, said pigment composition having been treated with a polyamine, wherein the improvement comprises:
   using as the polyamine a linear alkyl polyamine, said polyamine having the formula

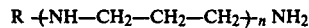
   $$R-(NH-CH_2-CH_2-CH_2)_n NH_2$$

wherein R is a saturated or unsaturated alkyl group having at least 12 carbon atoms and n is at least 3, thereby producing such improved ink which shows less penetration into and higher gloss on uncoated paper stock.

8. The printing ink of claim 7 wherein the linear alkyl polyamine is 1, 3 propanediamine, N-(3-amino propane)-N'-(N-tallow alkyl-3-aminopropane).

9. The printing ink of claim 7 wherein the ink contains an aromatic solvent.

10. The printing ink of claim 7 which additionally contains untreated diarylide yellow pigment.

11. The printing ink of claim 10 wherein the ratio of treated diarylide yellow pigment composition to untreated diarylide yellow pigment is about 1 part to 5 parts by weight.

12. The printing ink of claim 10 wherein the ink contains an aromatic solvent.

13. The printing ink of claim 11 wherein the ink contains an aromatic solvent.

* * * * *